United States Patent
Lee et al.

(10) Patent No.: US 9,247,160 B2
(45) Date of Patent: Jan. 26, 2016

(54) MULTI-STEP EXPOSURE METHOD USING ELECTRONIC SHUTTER AND PHOTOGRAPHY APPARATUS USING THE SAME

(75) Inventors: Tae-Ho Lee, Seoul (KR); Jeong-Won Lee, Seongnam-si (KR); Jae-Joon Moon, Anyang-si (KR); Il-Do Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 729 days.

(21) Appl. No.: 12/955,375

(22) Filed: Nov. 29, 2010

(65) Prior Publication Data

US 2011/0141331 A1     Jun. 16, 2011

(30) Foreign Application Priority Data

Dec. 10, 2009 (KR) .................. 10-2009-0122706

(51) Int. Cl.
*H04N 5/353* (2011.01)
*H04N 5/235* (2006.01)
*H04N 5/355* (2011.01)

(52) U.S. Cl.
CPC ........... *H04N 5/3535* (2013.01); *H04N 5/2353* (2013.01); *H04N 5/35554* (2013.01); *H04N 5/2351* (2013.01); *H04N 5/2355* (2013.01)

(58) Field of Classification Search
None
See application file for complete search history.

(56) References Cited

U.S. PATENT DOCUMENTS

| | | | |
|---|---|---|---|
| 2002/0060744 A1* | 5/2002 | Fukushima | .................. 348/364 |
| 2003/0001962 A1 | 1/2003 | Sakurai | |
| 2003/0020827 A1 | 1/2003 | Bean et al. | |
| 2006/0066750 A1 | 3/2006 | Henderson et al. | |
| 2007/0269200 A1 | 11/2007 | Rai et al. | |
| 2007/0273785 A1* | 11/2007 | Ogawa et al. | .................. 348/362 |
| 2008/0024631 A1* | 1/2008 | Tani et al. | ...................... 348/264 |
| 2008/0106602 A1* | 5/2008 | Nussbacher | .................. 348/187 |
| 2008/0253758 A1* | 10/2008 | Yap et al. | ...................... 396/234 |
| 2009/0073306 A1 | 3/2009 | Kwon et al. | |
| 2009/0135263 A1* | 5/2009 | Sorek et al. | ................. 348/218.1 |
| 2009/0174784 A1 | 7/2009 | Karlsson et al. | |
| 2009/0230288 A1* | 9/2009 | Blaesing | .................... 250/208.1 |
| 2009/0290052 A1* | 11/2009 | Liu | .................... H04N 5/35554 348/277 |
| 2010/0097493 A1* | 4/2010 | Asoma | ....................... 348/229.1 |

FOREIGN PATENT DOCUMENTS

| | | |
|---|---|---|
| JP | 09-214829 | 8/1997 |
| JP | 2000-278595 | 10/2000 |
| KR | 100189054 | 1/1999 |
| WO | WO 2007/126288 | 11/2007 |

OTHER PUBLICATIONS

Chinese Office Action dated Jan. 15, 2015 issued in counterpart application No. 201010580615.8.
Chinese Office Action dated Jun. 3, 2015 issued in counterpart application No. 201010580615.8, 7 pages.
1st Chinese Office Action dated May 14, 2014 issued in counterpart application No. 201010580615.8, 11 pages.
2nd Chinese Office Action dated Jan. 15, 2015 issued in counterpart application No. 201010580615.8, 7 pages.
3rd Chinese Office Action dated Jun. 3, 2015 issued in counterpart application No. 201010580615.8, 7 pages.

* cited by examiner

*Primary Examiner* — Justin P Misleh
(74) *Attorney, Agent, or Firm* — The Farrell Law Firm, P.C.

(57) ABSTRACT

A multi-step exposure method using an electronic shutter and a photography apparatus using the same are provided. The photography apparatus includes an image sensor, and a control unit which divides an area of the image into a first area and a second area using brightness information of the acquired image, and controls so that a first row group and a second row group of the second area have different exposure times. As a result, an image with a wider dynamic range is provided.

20 Claims, 9 Drawing Sheets

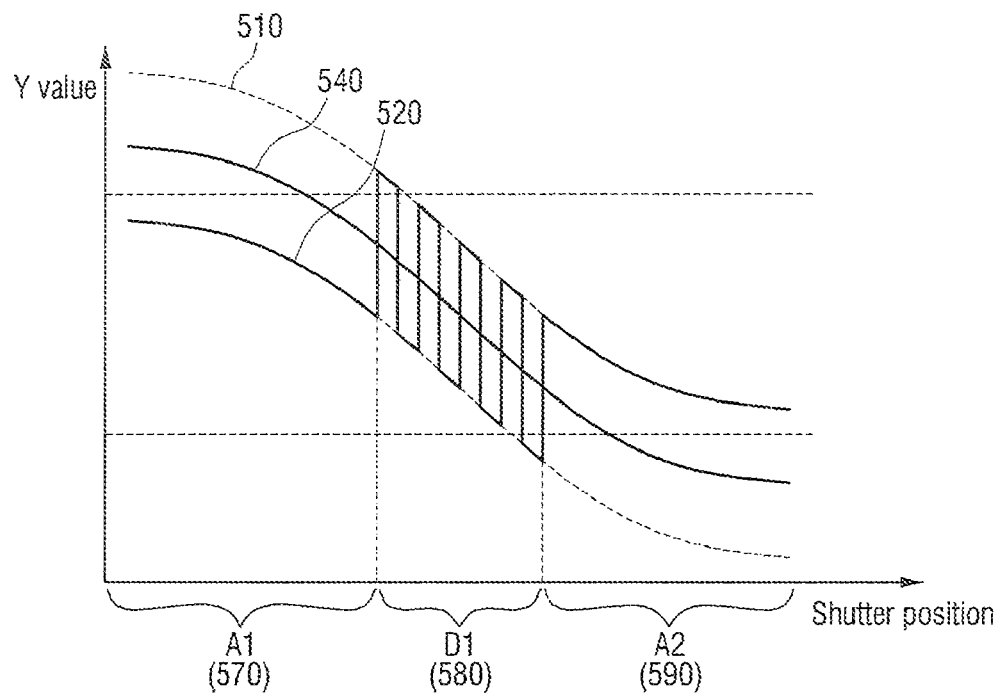

MULTI-STEP EXPOSURE METHOD USING ELECTRONIC SHUTTER AND PHOTOGRAPHY APPARATUS USING THE SAME

CROSS-REFERENCE TO RELATED APPLICATIONS

This application claims priority under 35 U.S.C. §119 from Korean Patent Application No. 10-2009-0122706, filed on Dec. 10, 2009, in the Korean Intellectual Property Office, the entire disclosure of which is incorporated herein by reference.

TECHNICAL FIELD

The present disclosure generally relates to a multi-step exposure method using an electronic shutter and a photographing apparatus using the same, and more particularly, to an exposure method capable of increasing dynamic range by adjusting a reset timing of an image sensor, and a photography apparatus using the same.

BACKGROUND OF RELATED ART

Camera shutters are mainly categorized into lens shutters and focal plane shutters. The lens shutter is generally mounted near the lens, and the focal plane shutter is generally mounted near the focal plane.

The focal plane shutter is also generally categorized into a horizontal shutter and a vertical shutter depending on the traveling direction of the front and rear curtains. Among these, the vertical shutter is more advantageous in terms of performance and thus has been in wider use.

In a photogaphy apparatus employing focal plane shutter, an image of an object is exposed on a photosensitive surface through a lens as the two curtains, i.e., front and rear curtains, travel. To be specific, as the front curtain travels, the photosensitive surface of the photography apparatus is exposed, and after a predetermined time interval, the rear curtain travels and thus the photography process is finished.

Recently, in order to address problems associated with the mechanical shutter, for example, shock on the front curtain or release time lag generated due to a need for a temporal interval for the charging of the front curtain, many technologies have been introduced to process the front curtain of the focal plane shutter electronically.

One example of these technologies utilizes a reset signal, which is used to initiate the exposure of the respective pixels in an image sensor such as a charge-coupled device (CCD) or CMOS image sensor (CIS) in sequence in the unit of pixel lines and thus replace the function of the front curtain.

A photography apparatus using an electronic shutter generally includes an auto focus (AF) system and an auto exposure (AE) system. The AF system adjusts a focal point of the photographed object automatically, by analyzing differences with respect to an image acquired through the image sensor. The AE system determines the brightness of the photographed object to automatically determine the exposure, in which the opening degree of the aperture and the speed of the shutter are controlled in consideration of the appropriate amount of exposure of the photographed object to set the appropriate exposure automatically.

However, despite the continuous efforts to improve the 'dynamic range' (range of highlight and shadow acceptable by the apparatus), even the photography apparatus employing the AE system suffers disadvantages such as distortion of the scene being photographed or degradation of resolution.

SUMMARY OF THE DISCLOSURE

According to an aspect of the present disclosure, there is provided a photography apparatus, including an image sensor which acquires an image of an object, and a control unit which divides an area of the image into a first area and a second area using brightness information of the acquired image, and controls so that a first row group and a second row group of the second area have different exposure times.

According to an aspect of the present disclosure, there is provided a photography method, including acquiring an image of an object, and dividing an area of the image into a first area and a second area using brightness information of the acquired image, and controlling so that a first row group and a second row group of the second area have different exposure times.

BRIEF DESCRIPTION OF THE DRAWINGS

Various features and advantages of the disclosure will become more apparent by the following detailed description of several embodiments thereof with reference to the attached drawings, of which:

FIGS. 5A to 5C are views provided to explain a process of compensating a double-exposed area according to an exemplary embodiment.

DETAILED DESCRIPTION OF SEVERAL EMBODIMENTS

Figure 1:
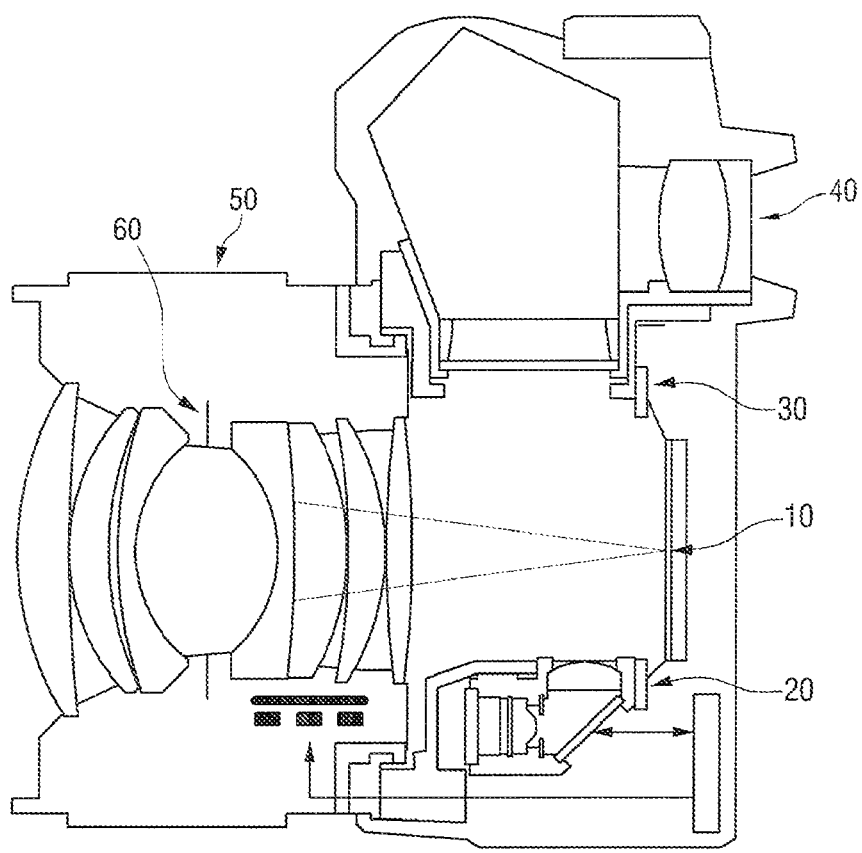
FIG. 1 is a view illustrating a structure of a photography apparatus according to an exemplary embodiment.

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments may be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

FIG. 1 illustrates a structure of a general photography apparatus which employs a focal plane shutter according to an exemplary embodiment. The photography apparatus includes an image sensor 10, a mechanical front curtain 20, a mechanical rear curtain 30, a viewfinder 40, a lens 50 and an aperture 60.

Referring to FIG. 1, the photography apparatus operating with the focal plane shutter includes the mechanical front curtain 20 and the mechanical rear curtain 30 formed in front of the image sensor 10 as the constituents of the focal plane shutter.

The image sensor 10 operates to receive light through the lens 50 and convert the received light into an electrical signal, and may be implemented as a charge-coupled device (CCD) or CIS image sensor. In one embodiment, the amount of exposure may be adjusted by adjusting the timing of a reset which is to initiate the accumulation of the electric potential by the photosensitive element.

The mechanical front curtain 20 and the mechanical rear curtain 30 of the focal plane shutter operate to open and close the path of the light to the image sensor 10. The shutters may generally be divided into horizontal shutter and the vertical shutter depending on the direction of traveling of the front and rear curtains, but the embodiment of the disclosure will be explain with reference to the vertical shutter as an example.

The front curtain 20 shields the image sensor before the exposure and initiates exposure as it begins traveling. The rear curtain 30 operates to shield the exposure following the initiation of the exposure. Accordingly, the exposure to the image sensor is adjusted in the focal plane shutter in the manner of a slit, traveling to scan the image sensor 10 (i.e., the front curtain 20 and the rear curtain 30 travel in parallel at a predetermined distance from each other).

The aperture 60 is arranged within the lens to control the aperture to control the amount of light passing the lens. The lens shutter has an increased difficulty to operate at high shutter speeds with a larger aperture. However, in the case of focal plane shutter, due to the slit traveling, the shutter is always operated at high speed irrespective of the aperture.

A user looks through the viewfinder 40 to arrange an image to be photographed.

Although the embodiment is explained with reference to a camera as a reference, the technical concept of the embodiment is applicable to any device with a photography function such as a camcorder, a mobile phone, or the like.

Figure 2:
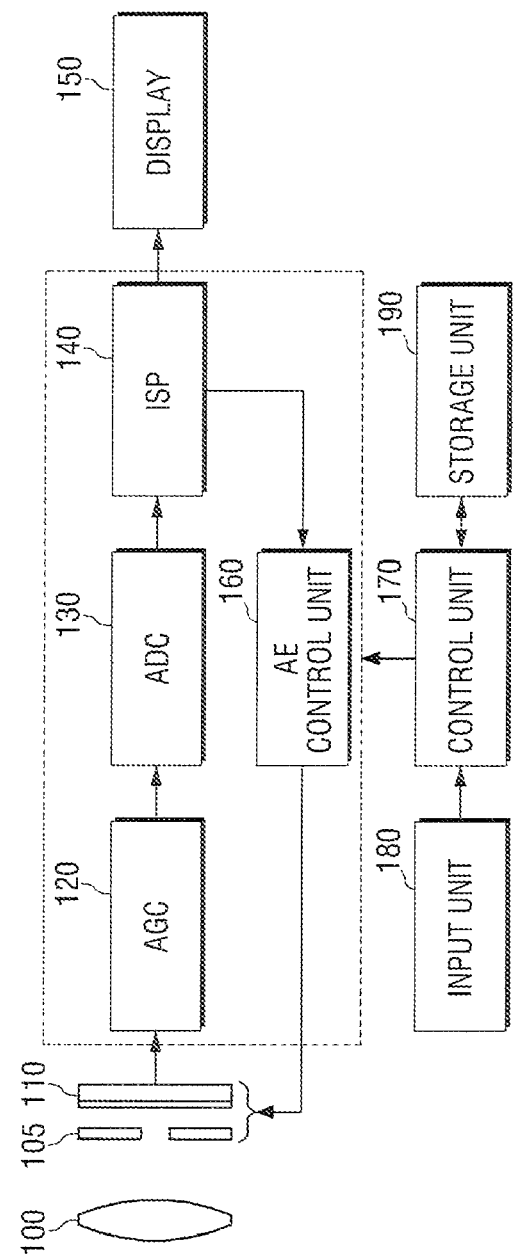
FIG. 2 is a block diagram of a photography apparatus according to an exemplary embodiment.

FIG. 2 is a block diagram of a photography apparatus according to an exemplary embodiment. The photography apparatus according to the exemplary embodiment includes a lens 100, a mechanical shutter 105, an image sensor 110, an automatic gain control (AGC) 120, an analog-to-digital converter (ADC) 130, an image signal processor (ISP) 140, a display 150, an AE control unit 160, a control unit 170, an input unit 180, and a storage unit 190.

The lens 100 receives an image of a scene, and the mechanical shutter 105 adjusts the amount of exposure of the image sensor 110 through the traveling slit. The image sensor 110 not only converts an incoming optical signal into an electric signal, but also adjusts the amount of exposure through an electronic front curtain function.

After the received optical signal is converted into an electric signal by the image sensor 110, the electric signal is amplified to an appropriate size at the AGC 120 circuit. The amplified signal is converted from analog to digital signal as it passes the ADC 130 circuit.

After that, digital signal processing is performed at the ISP 140. The ISP 140 processes the signal so that the received image signal is displayed. Additionally, the ISP 140 receives signals with respect to respective areas of the image sensor with different exposures, compensates the received signals, composes to generate the whole image signal, and displays the generated whole image signal through the display 150.

The display 150 displays the image signal processed at the ISP 140 for the notice of the user, and may have the function of generating an On-Screen Display (OSD) or the like for the convenience of the user.

The AE control unit 160 controls the movement of the mechanical shutter 105 and the electronic shutter operation of the image sensor 10, using the exposure information computed at the ISP 140, and provides appropriate exposure for the respective areas of the image sensor 110.

The control unit 170 operates to control the overall operations including amplification, conversion or processing of the signal. The control unit 170 receives a user command inputted at the input unit 180 and controls the camera module based on the received user command.

Additionally, the control unit 170 controls the ISP 140 to generate a signal to control auto exposure (AE). To be specific, the control unit 170 computes the amount of exposure from the whole image signal received from the image sensor 110, and computes information about the amount of exposure based on the unit of areas into a multi-step exposure area and a double exposure area.

The control unit 170 also controls the AE control unit 160 according to the computed appropriate amount of exposure with respect to the areas divided as explained above, to apply different exposures to the respective areas.

The 'multi-step exposure area' herein refers to a combination of areas with the same appropriate amount of exposures based on the appropriate amount of exposure which is computed using the brightness information of the image, in which each of the areas receives a different reset pulse timing according to the control of the control unit 170 and thus has a different exposure time.

The 'double exposure area' herein refers to the areas located between the respective multi-step exposure areas, in which each area has exposure time adjusted based on the exposure times of the neighboring multi-step exposure areas according to the controlling of the control unit 170.

The storage unit 190 has the function of storing the current image or information necessary for controlling the photography apparatus.

The exposure method according to an exemplary embodiment will be explained in greater detail below with reference to FIGS. 3A and 3B.

Figure 3A:
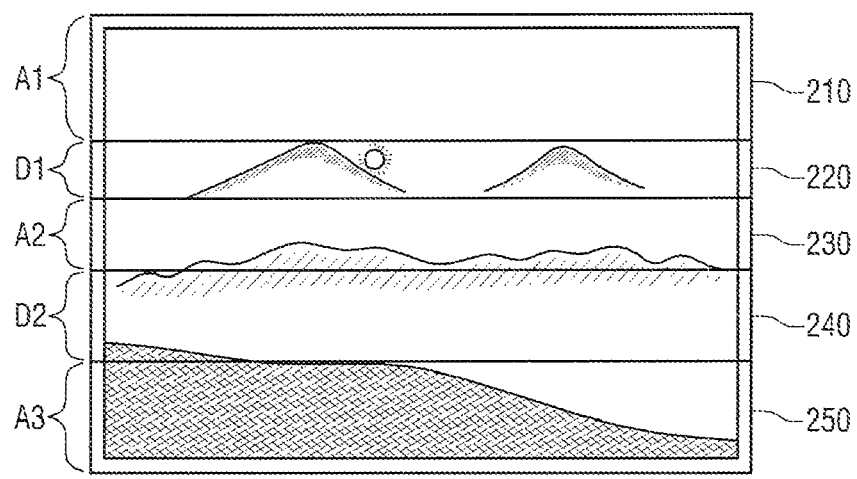
FIGS. 3A and 3B are views provided to explain a multi-step exposure method according to an exemplary embodiment.
Figure 3B:
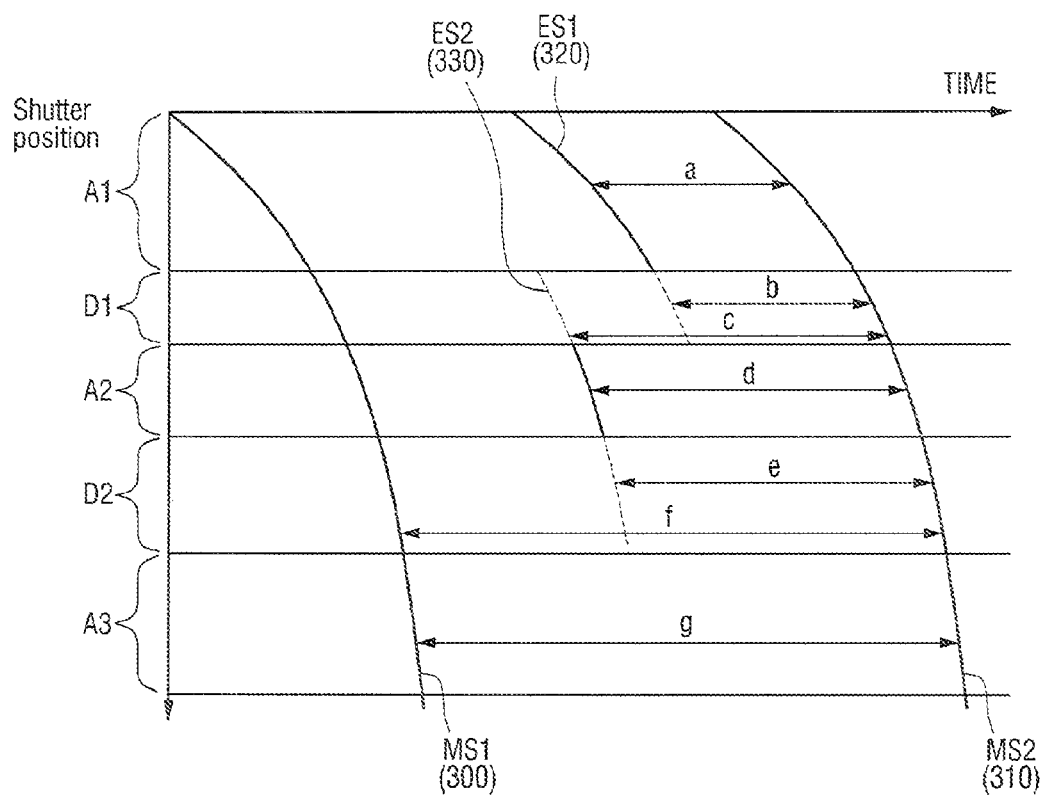

FIG. 3A illustrates an image with strong light and shadow received at the image sensor, and FIG. 3B illustrates the operation of the shutter according to the respective areas of the image sensor.

Referring to FIG. 3A, the image has a bright upper portion and very dark lower portion. The middle portion has an intermediate degree of brightness compared to the upper and lower portions.

First, the control unit 170 computes an appropriate exposure based on the information about the entire brightness determined from the incoming image signal and divides the image into areas in consideration of the computed appropriate exposure. Referring to FIG. 3A, the bright upper portion (A1) 210 has to have a short exposure, while the dark lower portion (A3) 250 has to have a long exposure. Thus, the middle portion (A2) 230 with the intermediate degree of brightness needs intermediate exposure.

The short exposure may be performed by adjusting the reset timing of the image sensor 110 to have short exposure time. Referring to FIG. 3B, reset pulse of the image sensor 110 is generated according to the traveling curve of the first electronic shutter (ES1) 320 and accordingly, the A1 area has the relatively short exposure time (a).

The intermediate exposure is also performed by adjusting the reset timing of the image sensor 110. Accordingly, referring to FIG. 3B, a reset pulse of the image sensor 110 is generated according to the traveling curve of the second electronic shutter (ES2) 330, so that the A2 area has the intermediate exposure time (d).

The long exposure is performed as the exposure time is adjusted according to the traveling of the mechanical shutters 300, 310, so that A3 area has a long exposure time (g) from when the mechanical front curtain (MS1) 300 travels until when the mechanical rear curtain 310 travels.

A boundary area (D1) 220 between the short exposure area (A1) 210 and the intermediate exposure area (A2) 230, and a boundary area (D2) 240 between the intermediate exposure area (A2) 230 and the long exposure area (A3) 250 have double exposure.

Accordingly, with respect to the area (D1) 220, different reset pulses are generated with respect to even and odd rows of the image sensor 110, so that different exposure times are set. Referring to FIG. 3B, the even rows of the area (D1) 220 have shorter exposure time (b) as the reset pulse of the image sensor 110 is generated according to the traveling curve of the electronic front curtain (ES1) 320, while the odd rows have intermediate exposure time (c) as the reset pulse of the image sensor 110 is generated according to the traveling curve of the electronic front curtain (ES2) 330.

Accordingly, an image is generated, in which the boundary area (D1) 220 between the area (A1) 210 and the area (A2) 230 has different amounts of exposure with respect to the even and odd rows. As a result, the ISP 140 can generate an image with higher dynamic range by receiving a signal with respect to the generated image and composing images of even and odd rows.

Likewise, with respect to the area (D2) 240, different reset pulses are generated with respect to even and odd rows of the image sensor 110, so that different exposure times are set. Referring to FIG. 3B, the even rows of the area (D2) 240 have shorter exposure time (e) as the reset pulse of the image sensor 110 is generated according to the traveling curve of the electronic front curtain (ES2) 330, while the odd rows have long exposure time (f) as the reset pulse of the image sensor 110 is generated according to the traveling curve of the mechanical rear curtain (MS2) 310.

As explained above, the entire area is divided into a plurality of areas according to exposure values, the respective areas are given different exposure times based on adjusting the timing of the reset pulse of the mechanical shutter 105 and the image sensor 110, and the boundary area has different exposure times for even and odd rows with respect to an area with double exposure before the generated images are composed. Accordingly, a photographing apparatus with higher dynamic range is provided.

Although three multi-step exposure areas and two double exposures area have been explained in the embodiment explained above, these are written only for illustrative purpose, and accordingly, one in the art would be able to understand that a larger or smaller number of areas may be implemented.

Furthermore, although the double exposure area is divided into even and odd row groups which are adjusted to have different exposure times, the manner of dividing groups is not limited to the specific example only.

Figure 4:
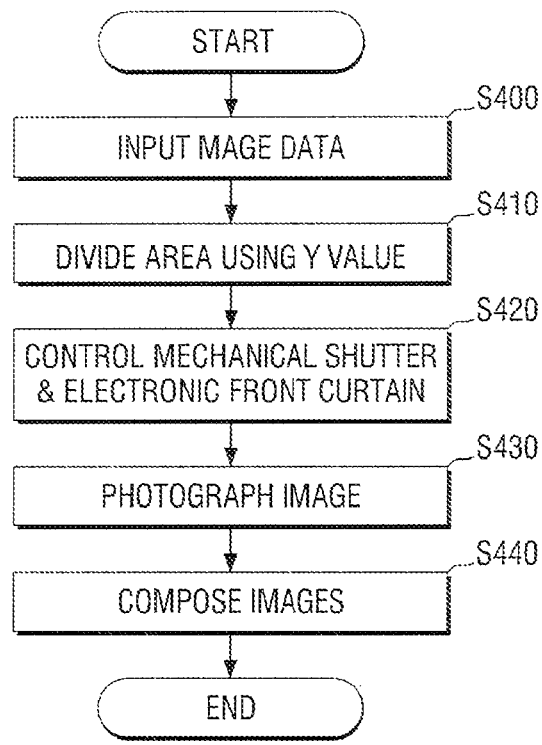
FIG. 4 is a flow chart of a multi-step exposure method according to an exemplary embodiment.

The multi-step exposure method according to an exemplary embodiment will be explained below with reference to FIG. 4.

First, at S400, an image of an object is received through the lens 100. At S410, an appropriate exposure value is computed using luminance (Y) from among the image signals of the received image, and the area of the image sensor is divided based on the computed appropriate exposure value.

At S420, the divided areas may include multi-step exposure areas and double exposure areas, in which the multi-step exposure areas have short/intermediate/long exposures based on the mechanical shutter and the electronic front curtain, and the double exposure areas have different exposure times based on the different reset pulse timing for the odd and even rows.

The process of providing different exposure time has already been explained above with reference to FIGS. 3A and 3B.

At S430, an image with extended dynamic range is photographed, and the generated image signal is compensated with respect to the respective areas. In this stage, an image signal with appropriate exposure has been generated with respect to the multi-step exposure areas, and an image with different exposure times for the odd and even rows has been generated with respect to the double exposure areas. Accordingly, the ISP 140 compensates for the images of the odd and even rows.

After that, at S440, the whole image is generated by composing the constituent images of the multi-step exposure areas and the compensated constituent images of the double exposure areas.

The compensation process with respect to the double exposure area will be explained in greater detail with reference to FIGS. 5A to 5C.

Figure 5A:
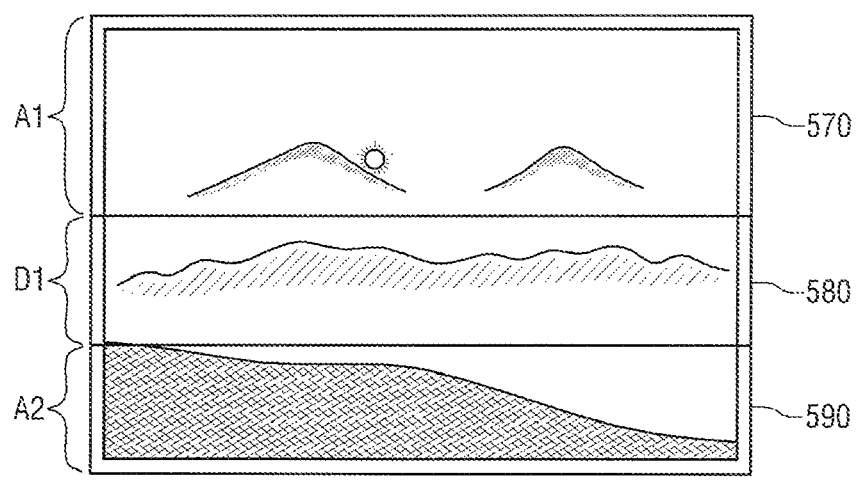

FIG. 5A illustrates an image having the brightest area (A1) 570, and the darkest area (A2) 590, and an intermediate-bright area (D1) 580 having an intermediate brightness between A1 and A2.

As explained above, A1 and A2 can be the multi-step exposure areas, and D1 can be the double exposure area.

Figure 5B:
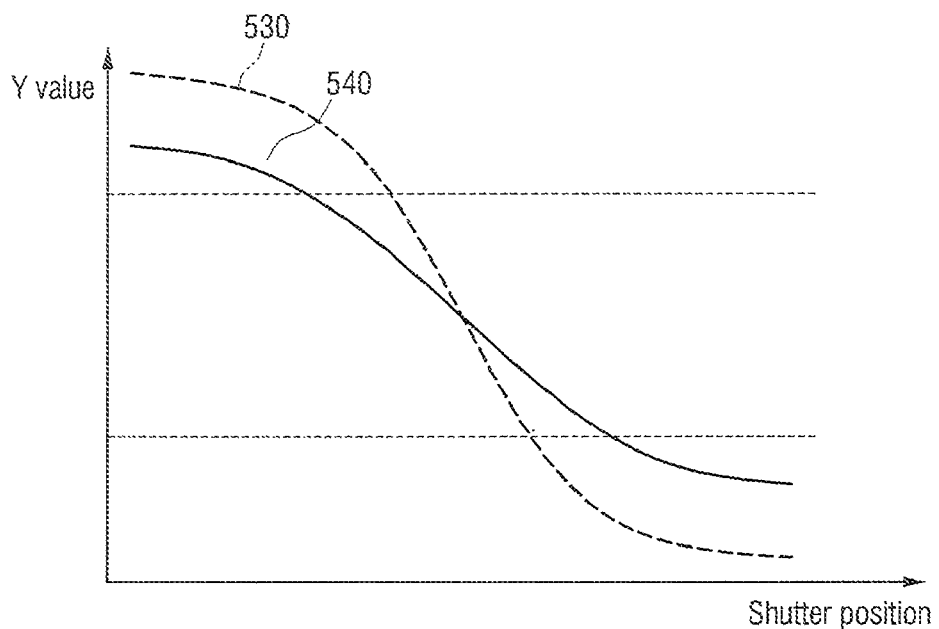

Referring to FIG. 5B, a sold line 540 represents the Y value of the actual image, and a dotted line 530 represents an error of the Y value with respect to the actual image. The error is generated in the photography apparatus with a conventional AE system, as the image generated with exposure according to the conventional AE exposure information has a bright area which is too bright and a dark area which is too dark.

In order to eliminate the exposure error, in one embodiment, the exposure time with respect to the bright area (A1) 570 is adjusted according to the short exposure curve 510 as illustrated in FIG. 5C. Accordingly, the reset timing of the electronic front curtain is adjusted so that an image signal with shorter exposure timing can be generated.

Since the dark area (A2) 590 needs long exposure, the exposure time is adjusted according to the long exposure curve 520 using the mechanical shutter. Accordingly, relatively longer exposure time is set according to the traveling of the mechanical front and rear curtains.

Meanwhile, the double exposure area (D1) 580 is provided with different exposure times with respect to even and odd rows, using the mechanical shutter and the electronic front curtain. That is, as the reset pulse is generated after completion of the traveling of the mechanical front curtain with respect to the even rows, relatively shorter exposure time is provided, while exposure is performed from when the mechanical front curtain travels until when the mechanical rear curtain travels with respect to the odd rows.

After that, the ISP extracts Y values for even and odd rows of the double exposure area (D) 580 with different exposure times due to the process explained above, and compensates image on the double exposure area (D1) 580 based on a ratio between Y value of the even rows and Y value of the odd rows. Alternatively, the ISP may compensate the area (D1) 580 based on a ratio between the exposure time with respect to the even rows and the exposure time with respect to the odd rows.

Referring to FIG. 5C, the even rows of the area (D1) 580 correspond to the short exposure curve 510, while the odd rows correspond to the long exposure curve 520. The double exposure areas after compensation at ISP correspond to the Y value curve 540 of the actual image.

After that, as (A1) 570, (D1) 580 and (A2) 590 are composed with each other, the whole image with extended dynamic range is acquired according to the Y value curve 540 of the actual image.

Figure 6:
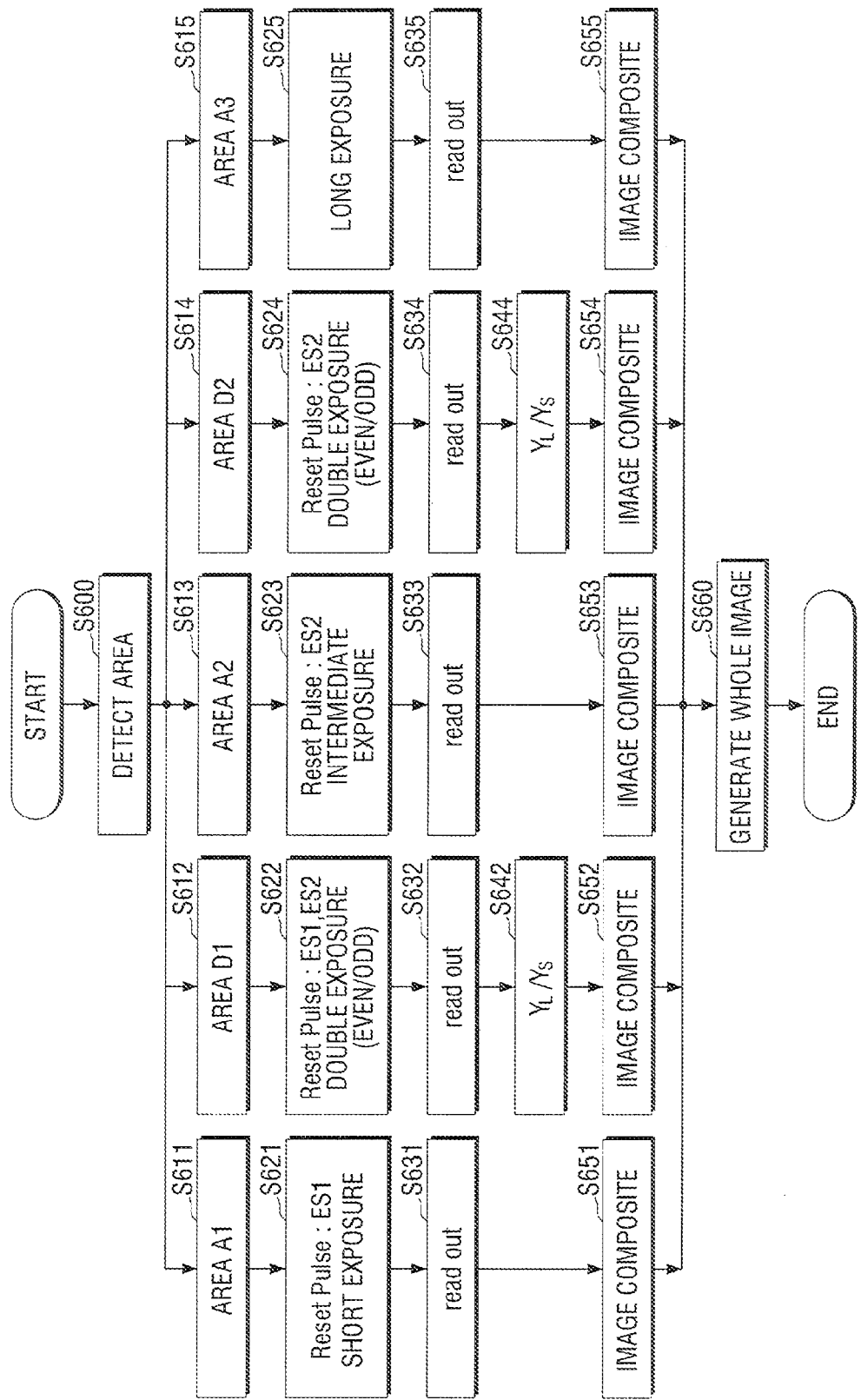
FIG. 6 is a flow chart of a multi-step exposure method according to an exemplary embodiment.

The multi-step exposure method according to an exemplary embodiment will be explained in greater detail below with reference to FIG. 6.

The exemplary embodiment will be explained with referring to FIG. 6, using an example where there are three multi-step exposure areas and two double exposure areas as in the case of FIGS. 3A and 3B. The overlapping technical features which have been explained above will not be explained for the sake of brevity. Accordingly, the main flow of the technical concept according to an exemplary embodiment will be mainly explained below.

At S600, an appropriate exposure value is computed based on Y values of the incoming image data and areas having the same appropriate exposure value are detected based on the computed exposure values. As a result, multi-step exposure areas (S611, S613, S615) and double exposure areas (S612, S614) are created. After that, different exposure times are provided for the respective areas based on the controlling on the reset timing of the mechanical shutter and the electronic front curtain (S621, S622, S623, S624, S625).

After that, image signals are read out with respect to the respective areas with different exposure times (S631, S632, S633, S634, S635). Considering that the even and odd rows of the double exposure area have different Y values, the ISP compensates the image corresponding to the double exposure area based on a ratio between Y value of the even rows and Y value of the odd rows, or based on a ratio between exposure time of the even rows and the exposure time of the odd rows (S642, S644). $Y_L$ refers to the Y value of the line with relatively longer exposure, and $Y_S$ refers to the Y value of the line with relatively shorter exposure.

Lastly, the images read from the respective areas are composed with each other (S651, S652, 5653, 5654, S655) so that the whole composite image is generated (S660).

According to the exemplary embodiments explained above, an exposure method with high dynamic range and a photography apparatus using the same are provided. Furthermore, the exposure method and the photography apparatus using the same are capable of providing a higher resolution, and a high-definition image through compensation of shadows/highlights, as well as increased dynamic range.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A photography apparatus, comprising:
   an image sensor which acquires an image of an object; and
   a control unit which divides an area of the image into a first horizontal area and a second horizontal area based on brightness information of the acquired image, and controls so that even rows and odd rows of a third horizontal area have different exposure times from each other,
   wherein the third horizontal area is located between the first horizontal area and second horizontal area,
   wherein the control unit adjusts the exposure times of the third horizontal area based on exposure times of the first horizontal area and the second horizontal area such that the even rows have the same exposure time as the first horizontal area and the odd rows have the same exposure time as the second horizontal area, and
   wherein each of the first and second horizontal areas includes odd rows and even rows, and the odd and even rows included in each of the first and second horizontal areas have exposure times set for each of the first and second horizontal areas.

2. The photography apparatus of claim 1, wherein the control unit controls a reset pulse timing differently with respect to the even and odd rows of the third horizontal area.

3. The photography apparatus of claim 1, further comprising an image signal processor (ISP) which generates a whole image by composing images of the first horizontal area, the second horizontal area, and the third horizontal area.

4. The photography apparatus of claim 3, wherein, with respect to the third horizontal area, the ISP extracts Y values of the even and odd rows and compensates image of the third horizontal area based on the extracted Y values.

5. The photography apparatus of claim 3, wherein, with respect to the third horizontal area, the ISP computes a ratio between the Y value of the odd rows and the Y value of the even rows and compensates image of the third horizontal area based on the computed ratio.

6. The photography apparatus of claim 3, wherein, with respect to the third horizontal area, the ISP computes a ratio between exposure time of the even rows and exposure time of the odd rows and compensates image of the third horizontal area based on the computed ratio.

7. The photography apparatus of claim 1, wherein the brightness information is provided based on Y value of the image.

8. The photography apparatus of claim 1, wherein the control unit performs multi-step exposure in the first horizontal area and the second horizontal area, and double exposure in the third horizontal area.

9. The photography apparatus of claim 8, wherein the first or second horizontal area in which multi-step exposure is performed comprises areas with same appropriate exposure time, based on an appropriate exposure time computed based on the brightness information of the image, and
   the control unit controls by adjusting a reset pulse timing so that the first horizontal area and the second horizontal area have different exposure times.

10. The photography apparatus of claim 8, wherein the third horizontal area in which double exposure is performed comprises respective areas located between the first and second horizontal areas in which multi-step exposure is performed, and
    with respect to the respective areas in which double exposure is performed, the control unit adjusts exposure time of the respective areas in which double exposure is performed based on exposure times of the respective neighboring first and second horizontal areas in which multi-step exposure is performed.

11. A photography method, comprising:
    acquiring an image of an object; and
    dividing an area of the image into a first horizontal area and a second horizontal area based on brightness information of the acquired image; and
    controlling so that even rows and odd rows of a third horizontal area have different exposure times from each other, wherein the third horizontal area is located between the first horizontal area and the second horizontal area, wherein the exposure times of the third horizontal area are adjusted based on exposure times of the first horizontal area and the second horizontal area such that the even rows have the same exposure time as the first horizontal area and the odd rows have the same exposure time as the second horizontal area, and wherein each of the first and second horizontal areas includes odd rows and even rows, and the odd and even rows included in each of the first and second horizontal areas have exposure times set for each of the first and second horizontal areas.

12. The photography method of claim 11, wherein the controlling comprises controlling a reset pulse timing differently with respect to the even and odd rows of the third horizontal area.

13. The photography method of claim 11, further comprising generating a whole image by composing images of the first horizontal area, the second horizontal area, and the third horizontal area.

14. The photography method of claim 13, wherein, with respect to the third horizontal area, the generating comprises extracting Y values of the even and odd rows and compensating image of the third horizontal area based on the extracted Y values.

15. The photography method of claim 13, wherein, with respect to the third horizontal area, the generating comprises computing a ratio between the Y value of the odd rows and the Y value of the even rows and compensating image of the third horizontal area based on the computed ratio.

16. The photography method of claim 13, wherein, with respect to the third horizontal area, the generating comprises computing a ratio between exposure time of the even rows and exposure time of the odd rows and compensating image of the third horizontal area based on the computed ratio.

17. The photography method of claim 11, wherein the brightness information is provided based on Y value of the image.

18. The photography method of claim 11, wherein the controlling includes performing multi-step exposure in the first horizontal area and the second horizontal area, and double exposure in the third horizontal area.

19. The photography method of claim 18, wherein the first or second horizontal area in which multi-step exposure is performed comprises areas with same appropriate exposure time, based on an appropriate exposure time computed based on the brightness information of the image, and the controlling comprises controlling by adjusting a reset pulse timing so that the first horizontal area and the second horizontal area have different exposure times.

20. The photography method of claim 18, wherein the third horizontal area in which double exposure is performed comprises respective areas located between the first and second horizontal areas in which multi-step exposure is performed, and with respect to the respective areas in which double exposure is performed, the controlling comprises adjusting exposure time of the respective areas in which double exposure is performed based on exposure times of the respective neighboring first and second horizontal areas in which multi-step exposure is performed.

* * * * *